(12) United States Patent
Cho

(10) Patent No.: US 10,936,184 B2
(45) Date of Patent: Mar. 2, 2021

(54) DISPLAY APPARATUS AND CONTROLLING METHOD THEREOF

(71) Applicant: Samsung Electronics Co., Ltd., Suwon-si (KR)

(72) Inventor: Hyo-young Cho, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 62 days.

(21) Appl. No.: 15/856,496

(22) Filed: Dec. 28, 2017

(65) Prior Publication Data

US 2018/0188944 A1 Jul. 5, 2018

(30) Foreign Application Priority Data

Jan. 2, 2017 (KR) ........................ 10-2017-0000221

(51) Int. Cl.
*G06F 3/0488* (2013.01)

(52) U.S. Cl.
CPC ..... *G06F 3/04883* (2013.01); *G08C 2201/30* (2013.01); *G08C 2201/32* (2013.01); *G08C 2201/93* (2013.01)

(58) Field of Classification Search
CPC ........................... G06F 3/04883; G06F 3/0416
See application file for complete search history.

(56) References Cited

U.S. PATENT DOCUMENTS

| | | | |
|---|---|---|---|
| 8,271,908 B2 | 9/2012 | Li et al. | |
| 9,654,720 B2 | 5/2017 | Na et al. | |
| 9,811,750 B2 | 11/2017 | Kim et al. | |
| 9,870,123 B1* | 1/2018 | Pope ................. | H04N 21/42204 |
| 2009/0000832 A1* | 1/2009 | Marggraff ........... | G06F 3/03545 178/19.01 |
| 2010/0315358 A1* | 12/2010 | Chang ................. | G06F 3/04883 345/173 |
| 2011/0047493 A1 | 2/2011 | Sung et al. | |
| 2013/0188081 A1* | 7/2013 | Kulas .................... | G06F 3/0482 348/333.01 |
| 2014/0176600 A1* | 6/2014 | Lee .......................... | G06T 3/40 345/625 |
| 2014/0223321 A1* | 8/2014 | Kwon ................... | G06F 3/0488 715/740 |

(Continued)

FOREIGN PATENT DOCUMENTS

| | | |
|---|---|---|
| JP | 2016-24519 A | 2/2016 |
| KR | 10-0908845 B1 | 7/2009 |

(Continued)

OTHER PUBLICATIONS

International Search Report dated Apr. 19, 2018, issued in International Patent Application No. PCT/KR2017/015753.

*Primary Examiner* — Sherrod L Keaton
(74) *Attorney, Agent, or Firm* — Jefferson IP Law, LLP

(57) ABSTRACT

A display apparatus is provided. The display apparatus includes a communicator configured to communicate with an external device, a touch screen, and a processor configured to, in response to a preset event occurring in a standby mode, control the touch screen to receive a handwriting input of a user, and in response to the handwriting input of the user to control an external device being received through the touch screen, control the communicator to transmit a control command corresponding to the handwriting input to the external device.

9 Claims, 19 Drawing Sheets

(56) References Cited

U.S. PATENT DOCUMENTS

| | | | | |
|---|---|---|---|---|
| 2014/0244751 A1* | 8/2014 | Tseng | .................... | G06F 3/0482 |
| | | | | 709/204 |
| 2014/0253815 A1* | 9/2014 | Lee | ...................... | H04N 21/482 |
| | | | | 348/734 |
| 2014/0368474 A1 | 12/2014 | Kim et al. | | |
| 2014/0372896 A1* | 12/2014 | Raman | .................. | G06F 3/0488 |
| | | | | 715/741 |
| 2015/0062041 A1* | 3/2015 | Kim | ...................... | G06F 3/0416 |
| | | | | 345/173 |
| 2015/0205520 A1 | 7/2015 | Yim et al. | | |
| 2015/0277545 A1* | 10/2015 | Flowers | .................. | G06F 9/545 |
| | | | | 713/323 |

FOREIGN PATENT DOCUMENTS

| KR | 10-2010-0033716 A | 3/2010 |
|---|---|---|
| KR | 10-2012-0068246 A | 6/2012 |
| KR | 10-2013-0121992 A | 11/2013 |
| KR | 10-2014-0146346 A | 12/2014 |
| KR | 10-2015-0026255 A | 3/2015 |
| KR | 10-2015-0086032 A | 7/2015 |
| KR | 10-1639074 B1 | 7/2016 |
| KR | 10-2016-0138362 A | 12/2016 |

* cited by examiner

DISPLAY APPARATUS AND CONTROLLING METHOD THEREOF

CROSS-REFERENCE TO RELATED APPLICATION(S)

This application claims the benefit under 35 U.S.C. § 119(a) of a Korean patent application filed on Jan. 2, 2017 in the Korean Intellectual Property Office and assigned Serial number 10-2017-0000221, the entire disclosure of which is hereby incorporated by reference.

TECHNICAL FIELD

The present disclosure relates to a display apparatus and a controlling method thereof. More particularly, the present disclosure relates to a display apparatus which controls operations of an external device a controlling method thereof.

BACKGROUND

Various types of electronic devices are being developed and distributed due to the development of electronic communication technology. In addition, a user can control the operation of these electronic devices in various ways.

For example, a user can directly operate a button provided on a television (TV) itself or control an operation of the TV using a remote controller. In addition, a user can download a TV remote control application to a smartphone and control the operation of the TV through the smartphone. As such, in order for an existing user to control a specific device, it is necessary to operate a button of the device itself or the remote controller, or execute an application.

In this case, when a user operates the button provided on the electronic device directly, if the electronic device is a set-type device such as a TV, it is inconvenient for the user, as the user should move to the position where the corresponding device is installed whenever the user operates the device. When using a remote control device such as a remote controller, it may be inconvenient for a user to separately operate remote controllers of each device.

In addition, even when an application for controlling various kinds of devices is downloaded and used in one device such as a smart phone, in order for the user to control a specific device, the user is required to execute another application each time the control target device is changed, and to control the device through another executed application and thus, the user may feel inconvenienced.

That is, even in case of a simple control command for operating the power of the devices, for example, when the power of an air conditioner is turned on after the power of the TV is turned on via the smartphone, a user should input a power-on command through the corresponding application after executing a TV remote control application and an air-conditioner control application respectively and a user may feel inconvenience.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a display apparatus for controlling an external device through handwriting input according to an event occurring in a standby mode and a controlling method of the display apparatus.

In accordance with an aspect of the present disclosure, a display apparatus is provided. The display apparatus includes a communicator configured to communicate with an external device, a touch screen, and a processor configured to, in response to a preset event occurring in a standby mode, control the touch screen to receive a handwriting input of a user, and in response to the handwriting input of the user to control an external device being received through the touch screen, control the communicator to transmit a control command corresponding to the handwriting input to the external device.

The display apparatus may further include a storage configured to store control device-specific command information, wherein the processor is configured to, in response to the handwriting input being received, determine a control target device and control command information which match the handwriting input based on the stored device specific control command information, and control the communicator to transmit the determined control command information to the determined control target device.

The processor may control the touch screen to display an object by applying power to a portion of the touch screen in the standby mode, and in response to the object being selected, control the touch screen to receive the handwriting input of the user.

The processor may control the touch screen to display the object for respective control target devices, in response to one of the displayed objects being selected, control the touch screen to receive the handwriting input of the user, and in response to the handwriting input being received, control the communicator to transmit a control command corresponding to the handwriting input to a control target device matched with the selected object.

The display apparatus may further include a sensor configured to sense detachment and attachment of a pen, wherein the processor may, in response to detachment of the pen being sensed through the sensor in the standby mode, control the touch screen to receive the handwriting input, and in response to attachment of the pen being sensed through the sensor after the handwriting input is received through the touch screen, control the communicator to transmit the control command to the external device.

The display apparatus may include a push type button, and the processor is configured to, in response to a predetermined operation regarding the push type button being input in the standby mode, control the touch screen to receive the handwriting input.

The touch screen may include a touch panel to receive a touch input and a display, wherein the standby mode is a mode, in response to a user command to enter the standby mode being input or a user command not being input for preset time, in which the display apparatus operates in a state of power of at least a part of the touch panel and display being blocked.

The processor is configured to, in response to the handwriting input being received, display the handwriting input on the touch screen.

In accordance with another aspect of the present disclosure, a controlling method of a display apparatus having a touch screen is provided. The controlling method includes entering a standby mode by the display apparatus, in response to a preset event occurring in the standby mode, controlling the touch screen to receive a handwriting of a user, and in response to the handwriting of the user being received to control an external device through the touch screen, transmitting a control command corresponding to the handwriting input to the external device.

The transmitting may include in response to the handwriting input being received, determining a control target device and control command information which match the handwriting input based on device-specific control command information stored in the display apparatus, and transmitting the determined control command information to the determined control target device.

The method may further include displaying an object by applying power to a portion of the touch screen in the standby mode, wherein the controlling the touch screen comprises, in response to the displayed object being selected, controlling the touch screen to receive the handwriting input of the user.

The displaying the object may include displaying the object for respective control target devices, the controlling the touch screen comprises, in response to one of the displayed objects being selected, controlling the touch screen to receive the handwriting input of the user, and the transmitting comprises, in response to the handwriting input being received, transmitting a control command corresponding to the handwriting input to a control target device matched with the selected object.

The display apparatus may further include a sensor configured to sense detachment and attachment of a pen, wherein the controlling the touch screen may include, in response to detachment of the pen being sensed through the sensor in the standby mode, controlling the touch screen to receive the handwriting input, wherein the transmitting may include, in response to attachment of the pen being sensed through the sensor after the handwriting input is received through the touch screen, controlling the communicator to transmit the control command to the external device.

The display apparatus may include a push type button, wherein the controlling the touch screen may include, in response to a predetermined operation regarding the push type button being input in the standby mode, controlling the touch screen to receive the handwriting input.

The touch screen may include a touch panel to receive a touch input and a display, wherein the standby mode is a mode, in response to a user command to enter the standby mode being input or a user command not being input for preset time, in which the display apparatus operates in a state of power of at least a part of the touch panel and display being blocked.

The transmitting may further include, in response to the handwriting input being received, displaying the handwriting input on the touch screen.

In accordance with another aspect of the present disclosure, a non-transitory computer-readable recordable medium is provided. The non-transitory computer-readable recordable medium includes a program to execute a controlling method of a display apparatus including a touch screen includes entering a standby mode by the display apparatus, in response to a preset event occurring in the standby mode, controlling the touch screen to receive handwriting of a user, and in response to the handwriting of a user being received to control an external device through the touch screen, transmitting a control command corresponding to the handwriting input to the external device.

According to various embodiments, a user may intuitively control an external device through a display apparatus. Accordingly, user convenience would be improved.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terms such as "first," "second," and so on may be used to describe a variety of elements, but the elements should not be limited by these terms. The terms are used only for the purpose of distinguishing one element from another.

A singular expression includes a plural expression, unless otherwise specified. It is to be understood that the terms such as "comprise" or "consist of" are used herein to designate a presence of characteristic, number, operation, element, component, or a combination thereof, and not to preclude a presence or a possibility of adding one or more of other characteristics, numbers, operations, elements, components or a combination thereof.

In the various embodiments of the present disclosure, a 'module' or a 'unit' may perform at least one function or operation, and be implemented as hardware (e.g., circuitry) or software, or as a combination of hardware and software. Further, except for the 'module' or the 'unit' that has to be implemented as particular hardware (e.g., a dedicated processor), a plurality of 'modules' or a plurality of 'units' may be integrated into at least one module and implemented as at least one processor.

Figure 1:
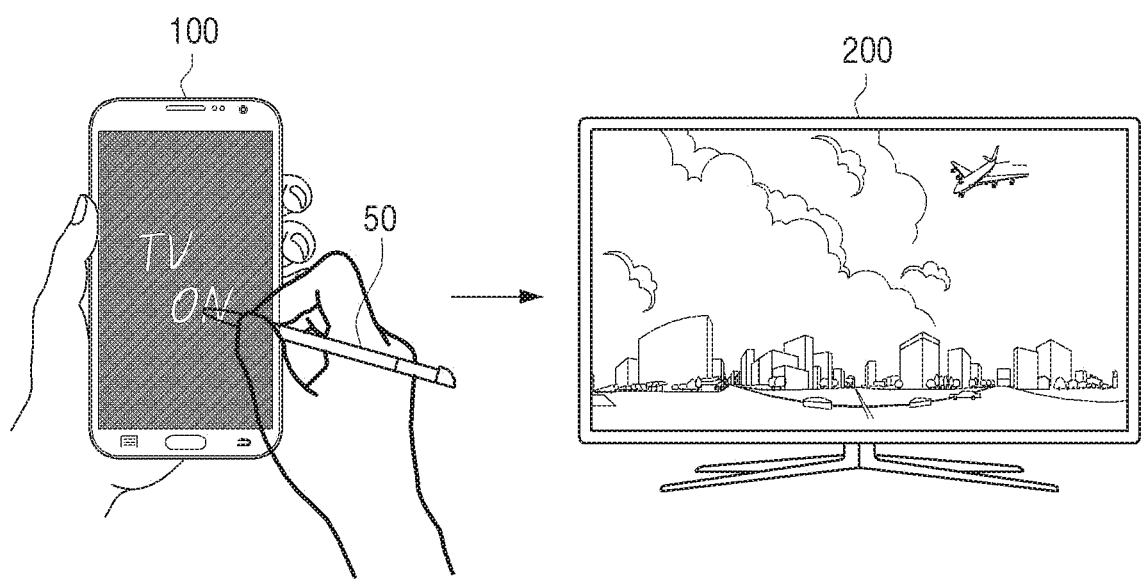
FIG. 1 is a view of an external device controlling system according to an embodiment of the present disclosure.

FIG. 1 is a view of external device control system according to an embodiment of the present disclosure.

Referring to FIG. 1, the external device control system 10 may include a display apparatus 100 and an external device 200.

The display apparatus 100 includes a touch screen and may control an operation of the external device 200 by inputting a control command with handwriting on a touch screen.

For example, while the display apparatus 100 operates in a standby mode, when a user takes out the pen 50 attached to the display apparatus 100, the display apparatus 100 may control a touch screen to receive handwriting input of a user.

Here, the standby mode indicates an operation mode that, when a user command to enter the standby mode is entered, or no user command is input for a predetermined time, the display apparatus 100 enters, and the display apparatus 100 may cut off power supply or supply low power to at least a part of the configurations constituting the display apparatus 100 in order to reduce the power consumption.

In this way, the standby mode is sometimes referred to as a low-power mode in terms of power because the standby power supply is cut off or a low-power power is supplied to a part of the display apparatus 100 in the standby mode. In the present disclosure, in order to distinguish the operation mode according to the state of the touch screen of the display apparatus 100, the term standby mode will be used.

In particular, according to an embodiment, the display apparatus 100 may cut off power of at least a part of an area of a touch screen in the standby mode.

For example, when a predetermined time has elapsed without the user's operation on the display apparatus 100, the display apparatus 100 can enter the standby mode by cutting off the entire power of the touch screen. In this manner, even if a user inputs a handwriting input to the touch screen, unless the phone is normally received or the standby mode is released according to a separate user operation in the standby mode in which all the power of the touch screen is blocked, the handwriting input would not be received.

However, according to one embodiment of the present disclosure, when the separation of the pen 50 is detected in the standby mode, the display apparatus 100 controls the touch screen to receive the user's handwriting input, and the display apparatus 100 may recognize the handwriting input of the user which is input on the screen, and transmit the recognized control command to the external device 200.

Meanwhile, the handwriting input of the user received through the touch screen differs from the simple touch input, such as selecting an object displayed on the touch screen. The handwriting input is performed by inputting characters, symbols, and figures on a touch screen. The handwriting the user can be input through the user's finger or various touch pens.

FIG. 1 illustrates a state that, while the display apparatus 100 is in a standby mode, a user writes a control command "TV ON" on a touch screen using the pen 50.

Here, it can be seen that the handwriting input of the user includes the name of the control target device and the control command. Accordingly, the display apparatus 100 may recognize the handwriting input of the user, determine the control target device and the control command, and transmit the determined control command to the determined control target device.

Referring to FIG. 1, the display apparatus 100 may recognize the user's handwriting input "TV ON", determine the control target device as external device 200, and determine the control command as "power on". Accordingly, the display apparatus 100 can transmit a control command such as power-on to the external device 200.

Accordingly, the external device 200 which receives the power-on command from the display apparatus 100 may turn on the power.

In the example of FIG. 1, the display apparatus 100 is a smart phone, but the present disclosure is not limited thereto. For example, the display apparatus 100 can be implemented as all the devices which can communicate with external devices such as a tablet, a notebook, a smart clock, a moving picture experts group phase 1 or phase 2 (MPEG-1 or MPEG-2) audio layer-3 (MP3) player, an electronic book, a camera, a camcorder, a game machine, a personal digital assistant (PDA), a project management professional (PMP), and have a touch screen.

The external device 200 is not limited to a television (TV) but may be all the devices such as a personal computer (PC), a notebook, a sound bar, a kiosk, a large format display (LFD), a table display, an electronic frame, an air conditioner, a washing machine, a vacuum cleaner, a refrigerator, a cooking device, a lighting equipment, and a smart car which are capable of receiving a control command from the display apparatus 100 and executing the control command.

In addition, FIG. 1 shows a case where the control command transmitted from the display apparatus 100 to the external device 200 is a power-on command, the control command is not limited to the power on or off of the external device 200. For example, in the TV, all the functions such as volume up/down, air volume up/down, lighting up/down, setting washing time of a washing machine and so on which are executable in the external device 200 according to types of the external device 200 can be control commands.

Hereinbelow, it is described that an external device 200 is a TV, and a control command is power-on through various embodiments.

Figure 2:
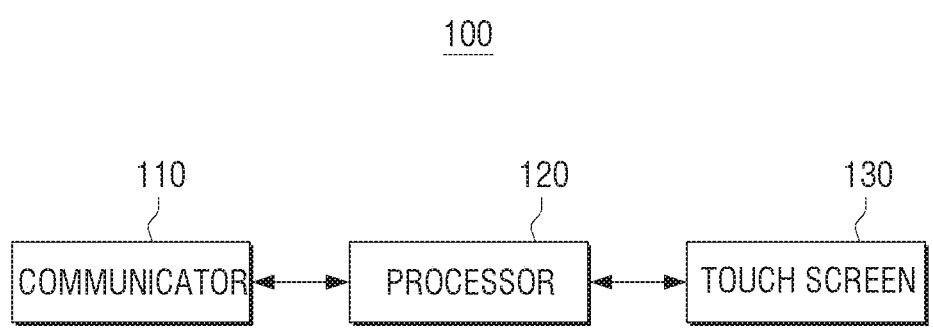
FIG. 2 is a block diagram of a display apparatus according to an embodiment of the present disclosure.

FIG. 2 is a block diagram of a display apparatus according to an embodiment of the present disclosure.

Referring to FIG. 2, the display apparatus 100 may include a communicator 110, a processor 120, and a touch screen 130.

The communicator 110 performs communication with the external device 200. To do this, the communicator 110 may perform communication with the external device 200 through various wired and wireless communication methods.

In particular, the communicator 110 may receive a control of the processor 120 and transmit a control command corresponding to the handwriting input to the external device 200.

For example, the communicator 110 may be connected to the external device 200 through an external server (not shown) to transmit a control command to the external device 200, or may transmit the control command to the external device 200 via an external server. The communicator 110 may directly transmit the control command to the external device 200 and transmit the control command to the external device 200. This will be described later in more detail with reference to FIGS. 9A and 9B.

The touch screen 130 may receive a user's touch input, and may display a graphic or an image. In particular, the touch screen 130 may receive a control of the processor 120 to display an object on a part of an area in the standby mode and receive a user touch input to select an object. To do this, the touch screen 130 may be controlled by the processor 120 to operate by areas.

The touch screen 130 may receive the handwriting input of the user under the control of the processor 120 when the predetermined event occurs in the standby mode. The handwriting input of the user is a touch input which is input by a user writing a character, a symbol, or a figure on the touch screen 130, and is distinguished from a touch input of a user for object selection.

In the meantime, the touch screen 130, when a touch input of a user is received, may provide coordinate information on the touch screen 130 corresponding to the received touch input to the processor 120.

The processor 120 controls the overall operation of the display apparatus 100. In particular, the processor 120 may control the touch screen to receive a user's handwriting input when a predetermined event occurs in the standby mode.

For example, if a user command for entering the standby mode is input or a user command is not input for a preset time, the processor 120 controls the display apparatus 100 to operate the display apparatus 100 in the standby mode. In particular, according to one embodiment of the present disclosure, the processor 120 may cut off all power supplied to the touch screen 130 to make the display apparatus 100 operate in a standby mode. In this case, the screen of the touch screen 130 is turned off in the standby mode, and even if the user touches the touch screen, the touch input is not received.

When the predetermined event occurs, the processor 120 may control the touch screen 130 to receive the handwriting input of the user. Specifically, the processor 120 may control the touch screen 130 to receive a handwriting input of a user input on the touch screen 130 by turning on the power supplied to the touch screen.

According to another embodiment of the present disclosure, the processor 120 can display an object by applying power to a part of the touch screen 130 in a standby mode. That is, if a user command for entering the standby mode is input or a user command is not input for a predetermined time, the processor 120 controls the touch screen 130 to operate only an area where the object is displayed from among the entire area of the touch screen 130. Accordingly, an object may be displayed in a partial area of the touch screen 130 in the standby mode, and when the object is selected by the user, the processor 120 may control the touch screen 130 to receive the handwriting input of the user.

In this case, when a user command for entering the standby mode is input or a user command is not input for a preset time, the object displayed on the touch screen 130 in the standby mode is a portion of the touch screen 130 and may be an icon corresponding to the external device 200 to be controlled, but is not limited thereto.

Accordingly, when a user's handwriting input is received to control the external device 200 through the touch screen 130, the processor 120 may control the communicator 110 to transmit a control command corresponding to the handwriting input to the external device 200.

Specifically, the processor 120 can recognize the handwriting input of the user. For example, if x, y coordinate information is provided from the touch screen 130 according to a handwriting order input by the user, the processor 120 may determine characters, symbols, or figures corresponding to the user's handwriting input based on the provided x, y coordinate information and stored model pattern information. However, the manner in which the processor 120 recognizes the handwriting input by the user is not limited thereto, and the handwriting input of the user can be recognized by using various other handwriting recognition techniques. Meanwhile, since the specific method by which the processor 120 recognizes the handwriting input of the user is not related to the gist of the present disclosure, a detailed description will be omitted.

The handwriting input by the user includes control command information about the external device to be controlled by the user, that is, information on the control target device such as the type and name of the control target device, and may be embodied as characters, symbols or figures. Also, the display apparatus 100 can store control command information for each device (or device-specific control command information). Accordingly, when the handwriting input of the user is recognized, the processor 120 determines external device 200 as the control target device and the control command which match the handwriting input information, based on the recognized handwriting input information and the stored control command information of each device (or device-specific control command information) and transmit the control command to the external device 200 determined control target device.

Meanwhile, as described above, when an object is displayed in the standby mode, the processor 120 may control the touch screen 130 to display an object for each control target device, according to an embodiment. In this case, the handwriting input by the user may be a character including only control command information related to a function that can be performed in the external device 200 determined as the control target device. In this embodiment, the user selects one of the objects displayed on the touch screen 130 without having to manually input the control target device, and selects the external device 200 determined as the control target device to which the control command is to be transmitted. Accordingly, when one of the objects displayed on the touch screen 130 is selected, the processor 120 controls the touch screen 130 to receive the handwriting input of the user, when the handwriting input is received, the control command corresponding to the received handwriting input is determined, and the control command determined for the control target device matching the selected object can be transmitted.

Also, when the object is displayed in the standby mode, the processor 120 may display the object according to the type of the control target device, not the control target device, according to an embodiment. On the other hand, in this case, there may be a plurality of devices of the same kind. The user may use the handwriting input of the user to distinguish the plurality of devices included in the same kind. Further detailed example of this will be described later with reference to FIGS. 7A and 7B.

According to an embodiment of the present disclosure, when there is a separate user command for transmitting a control command to the external device 200 determined as the control target device, the processor 120 may transmit a control command to the external device 200 determined as the control target device. A specific example of a user command for transmitting a control command to the external device 200 determined as the control target device will be described later.

Figure 3:
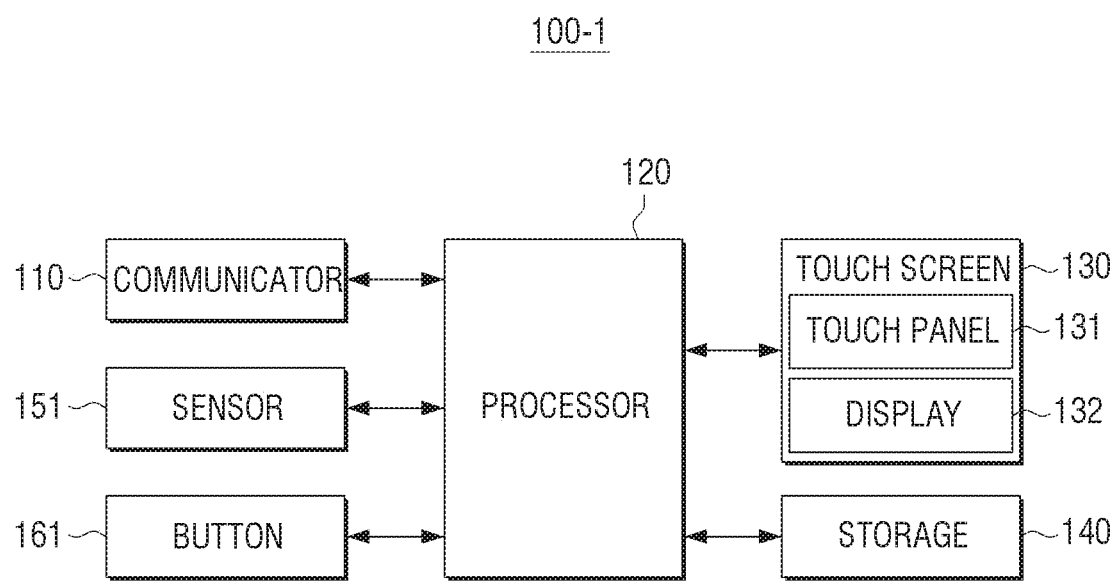
FIG. 3 is a block diagram of a display apparatus according to an embodiment of the present disclosure.

FIG. 3 is a block diagram of a display apparatus according to an embodiment of the present disclosure.

Referring to FIG. 3, a display apparatus 100-1 may include a communicator 110, a processor 120, a touch screen 130, a storage 140, a sensor 151 and a button 161. In the description of FIG. 3, a duplicate description of the same configuration as that described with reference to FIG. 2 will be omitted. The display apparatus 100-1 may be the display apparatus 100.

The touch screen 130 may include a touch panel 131 and a display 132. The touch panel 131 includes a plurality of touch sensors which are patterned with various methods, and provide coordinate information to the processor 120 by detecting a user's touch.

In particular, in the standby mode, the touch panel 131 can be operated by the processor 120 to receive a user touch input for selecting an object only in some area of the entire area, for example, only in an area where a specific object is displayed. In addition, the touch panel 131 can be controlled by the processor 120 to receive a user's handwriting input in the entire area when a preset event occurs in the standby mode.

The predetermined event may be an event that the sensor 151 detects the separation of the pen in a standby mode (hereinafter, referred to as a first standby mode) in which the entire power of the touch screen 130 is cut off, or an event that a predetermined user operation is input to a button 161. In a standby mode (hereinafter, referred to as a second standby mode) in which low-power power source is supplied to a part of the touch screen 130 and a specific object is displayed, the specific object may be selected by a user.

The display 132 displays a screen. Here, a screen may include a screen which plays back various contents such as an image, a video, a text, and music, an application execution screen including various contents, and various graphical user interface (GUI) screen, or the like.

In particular, the display 132 can display an object by supplying low power to a part of the area in the second standby mode. In this case, the object may be an icon corresponding to the device to be controlled, but the present disclosure is not limited thereto. For example, various widget screens (e.g., weather, living information, schedule management, clock, memo, etc.). The object displayed in the second standby mode may be displayed on the display 132 when the display apparatus 100-1 enters the standby mode by the user in an environment other than the standby mode.

For this purpose, the display 132 may be implemented as various displays such as a liquid crystal display, a thin film transistor-liquid crystal display, an organic light-emitting diode, a flexible display, A three-dimensional display (3D display), and the like.

In addition, the display 132 may have a layer structure with the touch panel 131 but is not limited thereto.

The sensor 151 senses the attachment and detachment of the pen 50. Specifically, the sensor 151 can detect attachment and detachment of the pen 50 in the display apparatus 100-1. At this time, the pen 50 may include various touch pens such as an active type, a passive type, an electrostatic type, and a pressure-sensitive type.

For example, the display apparatus 100-1 may include a space for accommodating the touch pen 50. The user may pull the pen 50 inserted in the storage space and use the pen 50, can store the pen again the storage space. At this time, when the user pulls out the pen 50 from the storage space, the sensor 151 senses the separation of the pen 50 from the display apparatus 100-1. When the pen 50 is inserted into the storage space again, the sensor 151 may detect the attachment of the pen 50 to the display apparatus 100-1.

As such, the sensor 151 may sense detachment and attachment of the pen 50 and provide a sensing signal to the processor 120.

The button 161 is a user interface provided in the display apparatus 100-1 to receive a user's operation. For example, when the button 161 is of the push type, the user can input a user command to the display apparatus 100 through an operation of pressing the button 161.

According to one embodiment of the present disclosure, when a predetermined operation is input to the button 161 in the standby mode, the processor 120 can control the touch screen 130 to receive the user's handwriting input. Therefore, there is no limitation on the type of the button 161. Even if a button to which a specific function is assigned in the past, if an operation of a button is defined differently, the button be used in various embodiments according to the present disclosure.

For example, the button 161 may be a power button, a home button, or a volume button. Other buttons provided according to the type of the display apparatus 100-1 may be a button 161 according to an embodiment of the present disclosure. The type of the button is not limited to the push type, and there is no limitation. Further, a separate button for operation according to the present disclosure may be provided in the display device 100-1.

The storage 140 may store various programs and data for the operation of the display apparatus 100-1. In particular, the storage 140 may store device-specific control command information. The device-specific control command information may be information obtained by matching a set of commands for functions that can be performed by the external device 200, for each device. The device-specific control command information may be received and stored directly from the external device through communication with the device, or may be received from the server managing the device-specific control command information and stored.

Meanwhile, according to one embodiment of the present disclosure, a storage 140 may store a device-specific remote control application. For example, the storage 140 may store a remote control application for each device. The device-specific remote control application may also be directly received from the corresponding device and stored or received from a separate server that manages the device-specific remote control application. Since the remote control application includes control command information of the device, the device-specific remote control application may also be included in the concept of device-specific control command information according to an embodiment of the present disclosure. The processor 120 may extract control command information included in the remote control application and separately generate and store control command information for each device.

The storage 140 may be implemented as a random access memory (RAM), read only memory (ROM), flash memory, hard disk drive (HDD), or solid state drive (SSD).

As described above with reference to FIG. 2, the communicator 110 can communicate with the external device 200 through various types of wireless communication methods. In particular, the communicator 110 may receive control command information, for example, a remote control application, from the external device 200. In addition, the communicator 110 may communicate with a separate server that manages a device-specific remote control application to receive a remote control application for the specific device.

The processor 120 controls overall operation of the display apparatus 100-1. According to one embodiment of the present disclosure, the processor 120 may control the touch screen 130 to receive the handwriting input of the user when the separation of the pen 50 is detected via the sensor 151 in the first standby mode. When the handwriting input is received through the touch screen 130 and then the attachment of the pen 50 is detected through the sensor 151, the processor 120 may control the communicator 110 to transmit a control command to the external device 200.

Specifically, in the first standby mode, power is cut off to both the touch panel 131 and the display 132, and no touch input of the user is received. When the user pulls the pen 50 in the first standby mode, the sensor 151 senses the separation of the pen 50 and provides a sensing signal to the processor 120. Accordingly, the processor 120 controls the touch screen 130 so that the handwriting input of the user can be received. Specifically, the processor 120 may supply power to the touch panel 131 to receive user handwriting input.

According to one embodiment of the present disclosure, when the processor 120 receives user's handwriting input, the processor 120 can display the received handwriting input on the touch screen 130. Specifically, the processor 120 may also supply power to the display 132 to display a user's handwriting input on the touch screen 130. However, according to an embodiment, the processor 120 may receive a user's handwriting input via the touch panel 131, but the power supplied to the display 132 may still be cut off so that the handwriting input of the user is not displayed on the touch screen 130.

As described above, when the handwriting input of the user is received, the processor 120 may recognize handwriting input, compare the recognized handwriting input with the device-specific control command information stored in the storage 140 to determine the control target device and control command information. Then, when the user inserts the pen 50 into the storage space of the display apparatus 100-1 again, the sensor 151 senses the attachment of the pen 50 and provides a detection signal to the processor 120. Accordingly, the processor 120 can control the communicator 110 to transmit the determined control command to the external device 200 determined as the control target device.

It is to be understood that the processor 120 may transmit a control command to the external device 200 determined as the control target device even if the attachment of the pen 50 is not detected. For example, the processor 120 may transmit a control command when the handwriting input of the user is not received for a certain period of time after the pen 50 is disconnected. In case of a different user operation, for example, tapping two times a touch screen after the handwriting input or pressing a specific pattern or a button, the processor 120 may control the communicator 110 to transmit a control command.

According to another embodiment, the processor 120 may control the touch screen 130 to receive handwriting input of a user, when a predefined user operation is input to the button 161 in the standby mode.

For example, in the first or second standby mode, the processor 120 may control the touch screen 130 to receive handwriting of a user when a user presses a home button or volume button for more than a predetermined time or repeatedly presses a power button in a predetermined frequency by using the button 161.

Accordingly, when the handwriting input of the user is received, the processor 120 may determine the control target device and the control command information as described above, and transmit the determined control command to the external device 200 determined as the control target device. For example, the processor 120 may or may not display a user's handwriting input on the touch screen 130 according to an embodiment, and transmit control command information when there is a specific operation command of a user such as tapping the touch screen 130 as much as the predetermined number after user handwriting input.

According to another embodiment, the processor 120, when an object displayed on the touch screen 130 is selected in the second standby mode, may control the touch screen 130 to receive handwriting input of a user.

Specifically, the processor 120 can supply low-power power only to the area of the display 132 where the object is to be displayed in the second standby mode, and can transmit power to the touch panel 131 to receive only the touch input of the area where the object is displayed. Accordingly, an object displayed in the second standby mode can be selected through the touch screen 130, and when the object is selected, the processor 120 can control the touch panel 131 to receive the handwriting input of the user.

Hereinafter, with reference to the examples illustrated in FIGS. 4A to 4C, 5A to 5D, 6A and 6B, 7A and 7B, 8, 9A and 9B, the operations of the display apparatus 100 according to various embodiments will be further described.

Figure 4A:
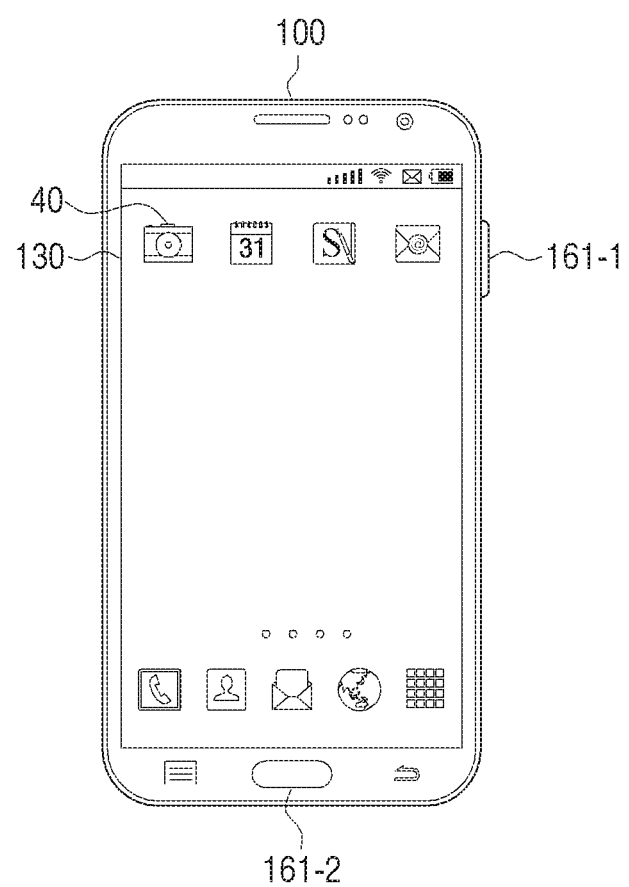
FIGS. 4A, 4B, and 4C are various views to describe a standby mode state according to an embodiment of the present disclosure.
Figure 4B:
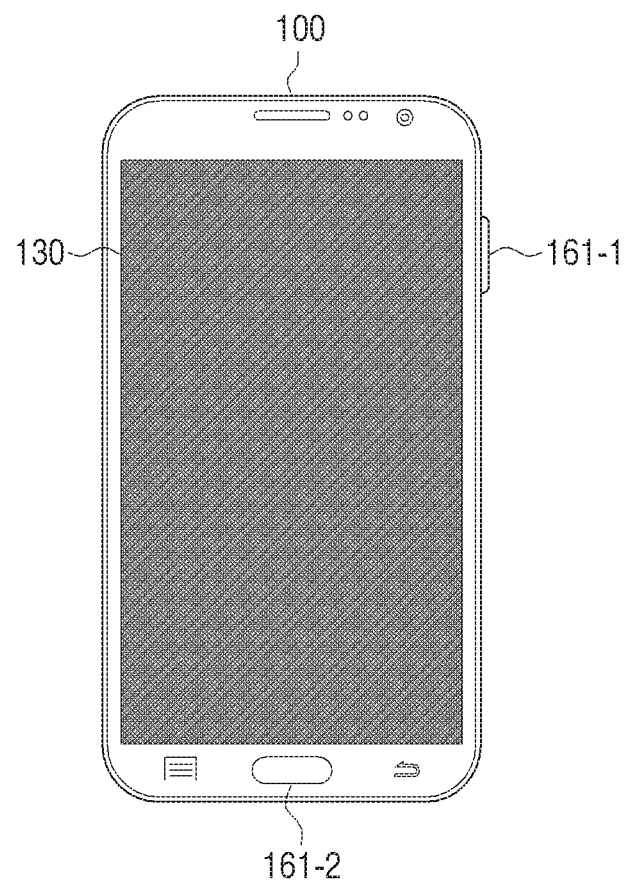
Figure 4C:
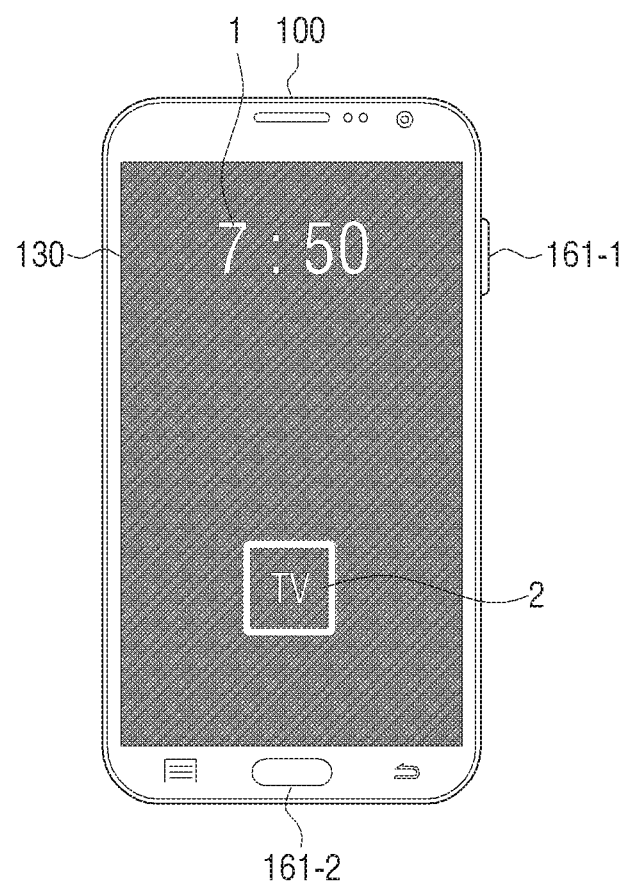

FIGS. 4A, 4B, and 4C are various diagrams for describing a standby mode according to an embodiment of the present disclosure.

FIG. 4A shows an example in which the display apparatus 100 operates in the normal mode. The normal mode refers to a case where the display apparatus 100 operates in a state other than the standby mode as described above. In the normal mode, normal driving power is supplied to the entire touch screen 130. As shown in FIG. 4A, in the normal mode, an object corresponding to various applications can be displayed on the touch screen 130, and a user can select an object and execute an application matched to the object. For example, when the user touches the camera icon 40 in FIG. 4A, the display apparatus 100 executes the camera application, and the state in which the camera application is executed also causes the display apparatus 100 to operate in the normal mode.

As such, while the display apparatus 100 operates in the normal mode, when a user command to enter the standby mode is input or a user command is not input for a predetermined time, the display apparatus 100 may enter the standby mode.

Referring to FIG. 4A, when the display apparatus 100 is operating in the normal mode, when the user presses the power on/off button 161-1 once, or there is no user operation in the display apparatus 100 for a predetermined time, the display apparatus 100 may turn off the power of the touch screen 130 to enter a first standby mode, as shown in FIG. 4B. As described above, since the first standby mode is a state in which the entire power of the touch screen 130 is cut off, nothing is displayed on the display 132 of the touch screen 130. That is, in the first standby mode, all backlights or all the light emitting diodes (LEDs) of the display 132 are turned off, the user sees a black screen. In addition, in the first standby mode, since all the power supplied to the touch panel 131 is also cut off, no touch input of the user is received.

Meanwhile, according to one embodiment of the present disclosure, while the display apparatus 100 is operating in the normal mode as shown in FIG. 4A, when the user presses the power on/off button 161-1 once, or makes no operation for a predetermined time, the display apparatus 100 may enter a second standby mode, as shown in FIG. 4C.

As described above, in the second standby mode, the display apparatus 100 can display an object by supplying low-power power to a part of the touch screen 130. The object includes a GUI or an icon corresponding to the type of the control target device or the control target device, according to an embodiment of the present disclosure. However, the objects that can be displayed in the second standby mode are not limited thereto, and various widget UIs may be displayed as objects in one area of the touch screen 130, according to an embodiment. Objects 1 and 2 may be set in the normal mode, if the display apparatus 100 enters the second standby mode, so that the objects are displayed in one area of the touch screen 130.

Referring to FIG. 4C, it can be seen that two objects 1 and 2 are displayed on the touch screen 130 in the second standby mode. The object 1 shows an example of a time widget UI, and the object 2 shows an example of a GUI corresponding to a TV which is an external device. At this time, the objects 1 and 2 may be displayed by supplying a low power to one area of the touch screen 130, and may be monochromatic, in order to reduce power consumption. As will be described later, the user can select the object 2 and input a handwriting input on the touch screen 130 for controlling the external device 200.

According to an embodiment, the display apparatus 100 may change a position of the objects 1 and 2 displayed in the second standby mode according to time. Accordingly, a burn-in issue can be overcome.

In the example of FIGS. 4A to 4C, as a user command that the display apparatus 100 enters the standby mode, a manipulation command of pressing the power button 161-1 once by a user is exemplified, but the present disclosure is not limited thereto, and the display apparatus 100 may enter the standby mode through other operations of the user. For example, the display apparatus 100 may be configured to detect the motion of the user, the motion of the display apparatus 100, the user's voice, the surrounding brightness, etc.

FIGS. 5A to 5D are views illustrating an operation of the display apparatus 100 according to an embodiment of the present disclosure when the pen 50 is removed.

Figure 5A:
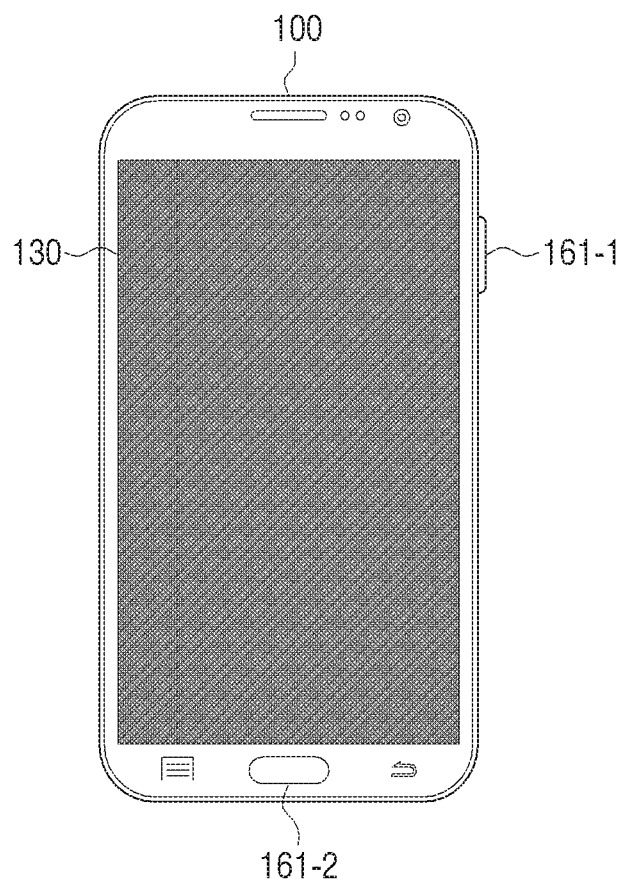
FIGS. 5A, 5B, 5C, and 5D are various views to illustrate an operation according to attachment and detachment of a pen of a display apparatus according to an embodiment of the present disclosure.
Figure 5B:
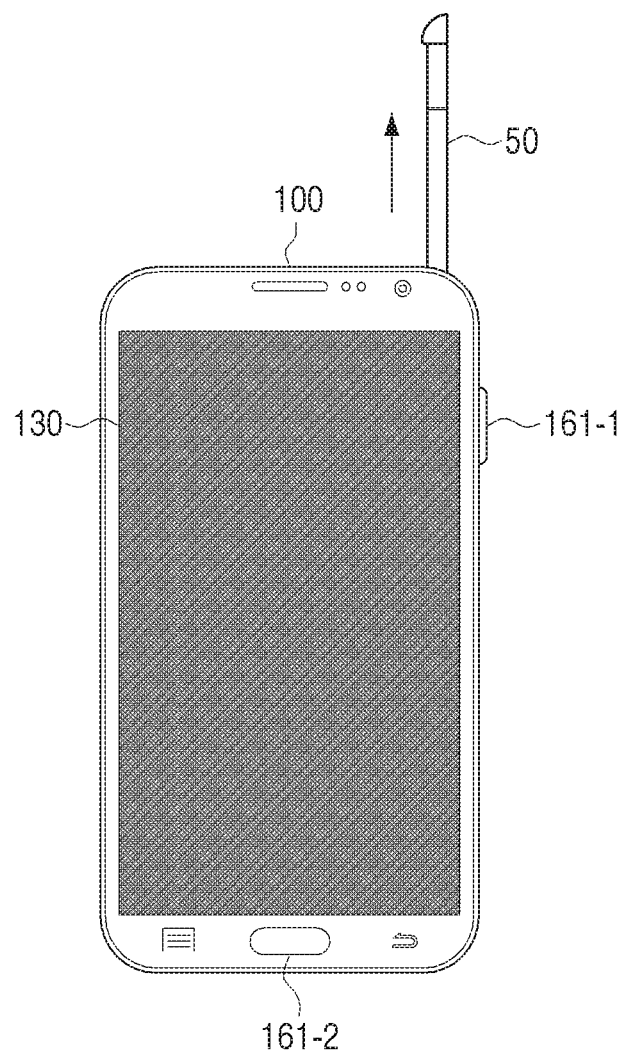
Figure 5C:
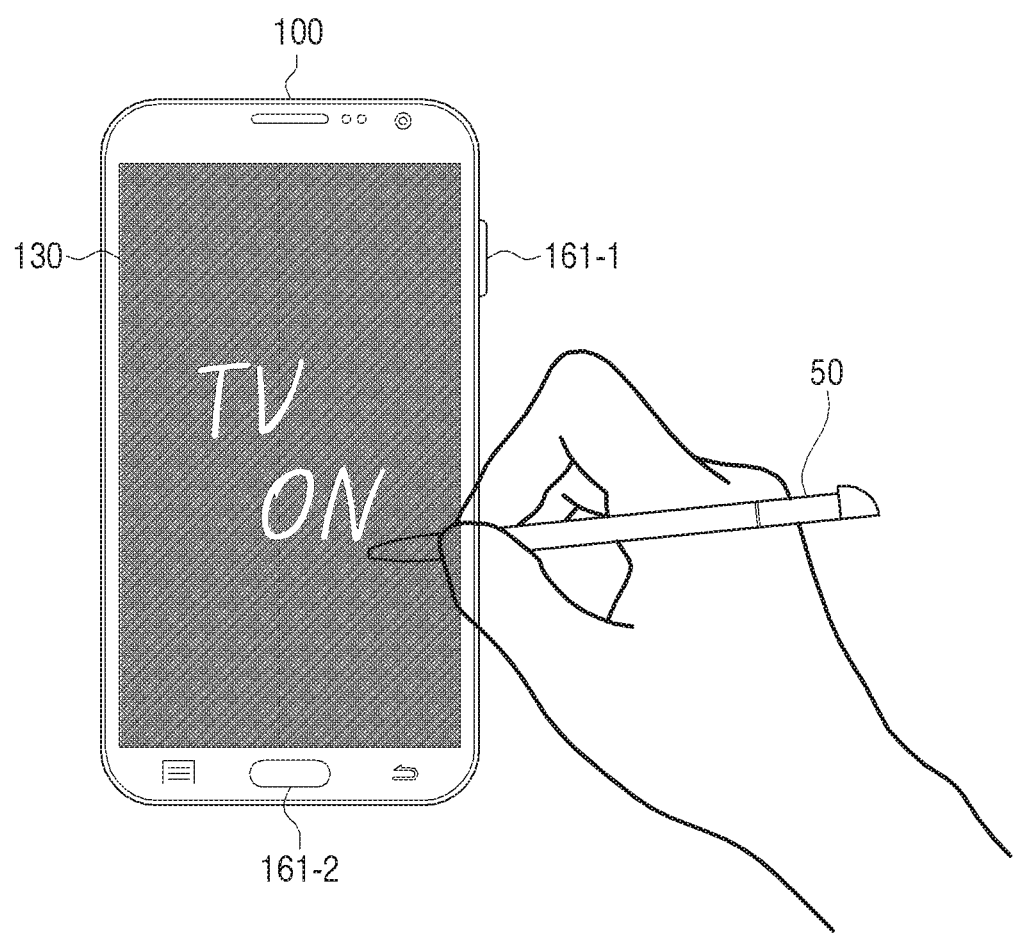

According to one embodiment of the present disclosure, when the separation of the pen 50 is detected as shown in FIG. 5B, the display apparatus 100 displays a user's handwriting input through the touch screen 130. Accordingly, the user can manually input a command "TV ON" on the touch screen 130 to turn on the TV, as shown in FIG. 5C. The display apparatus 100 may recognize the handwriting input of the user, and determine the external device 200 as the control target device and the control command by matching with the previously stored control command information. In the example of FIGS. 5A-5D, the control target device is "TV 200" and the control command is determined as "power on".

Figure 5D:
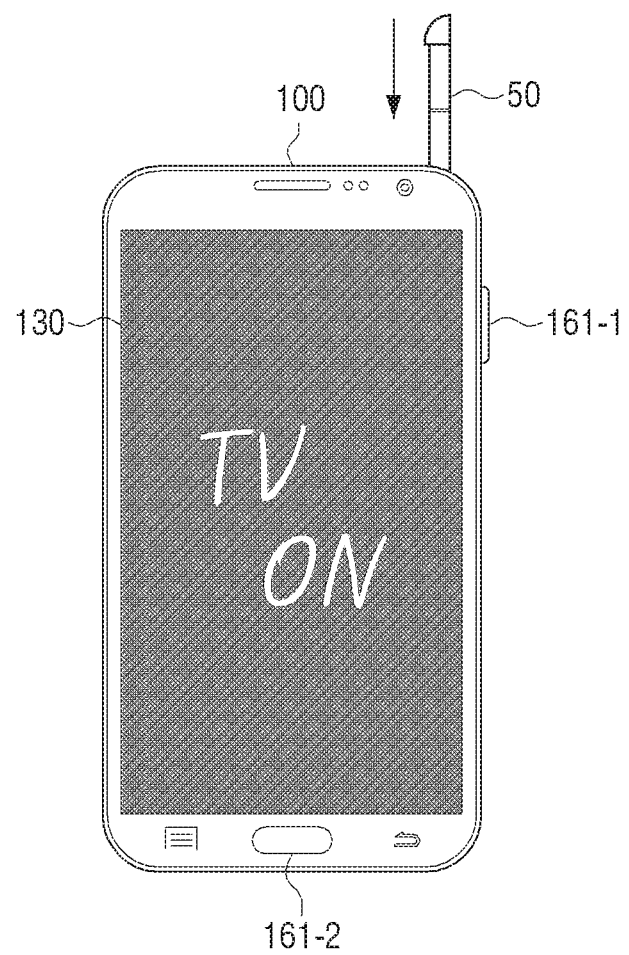

According to one embodiment of the present disclosure, when the user reinserts the pen 50 into the display apparatus 100, that is, when the attachment of the pen 50 to the display apparatus 100 is detected, the apparatus 100 can transmit a control command to the external device 200 determined as the control target device. That is, as illustrated in FIG. 5D, when the user inserts the pen 50 into the display apparatus 100 after the handwriting input and detects the attachment of the pen 50, the display apparatus 100 may transmit a power on command to the external device 200.

However, the present disclosure is not limited to the embodiment in which the display apparatus 100 is triggered to transmit the control command to the control target device after handwriting input by the user. According to the embodiment, when the external device 200 determined as the control target device and the control command are determined, the display apparatus 100 can automatically transmit a power on command to the external device 200. In addition, the display apparatus 100 may transmit a power-on command to the external device 200 when a user's handwriting input is completed and a predetermined time has elapsed.

Also, the display apparatus 100 may transmit a power-on command to the external device 200 when a predetermined user command other than the attachment of the pen 50 is input. For example, the display apparatus 100 can transmit a power-on command to the external device 200 when a tapping input is received twice continuously on the touch screen 130 after a user's handwriting input. Also, the display apparatus 100 may transmit a power-on command to the external device 200 when a predetermined operation is input to the power button 161-1 or the home button 161-2 after the handwriting input by the user. In addition, when the user inputs a voice command to tag the display apparatus 100 on the external device 200 or transmit a control command, or when the display apparatus 100 makes a motion toward the external device 200, the display apparatus 100 may send a power on command to the external device 200.

According to another embodiment of the present disclosure, when a predetermined user operation is input to the button 161 in the first standby mode, the display apparatus 100 may control the touch screen 130 to receive a user handwriting input. That is, for example, when the user presses the home button 161-2 for a long time or the volume button (not shown) for a long time in the first standby mode as shown in FIG. 5A, the display apparatus 100 may be in a state that a user may receive user handwriting input through the touch screen 130. Accordingly, as illustrated in FIG. 5C, a control command to power on the external device 200 is input on the touch screen 130, the display apparatus 100 may transmit the power-on command to the TV 200.

Figure 6A:
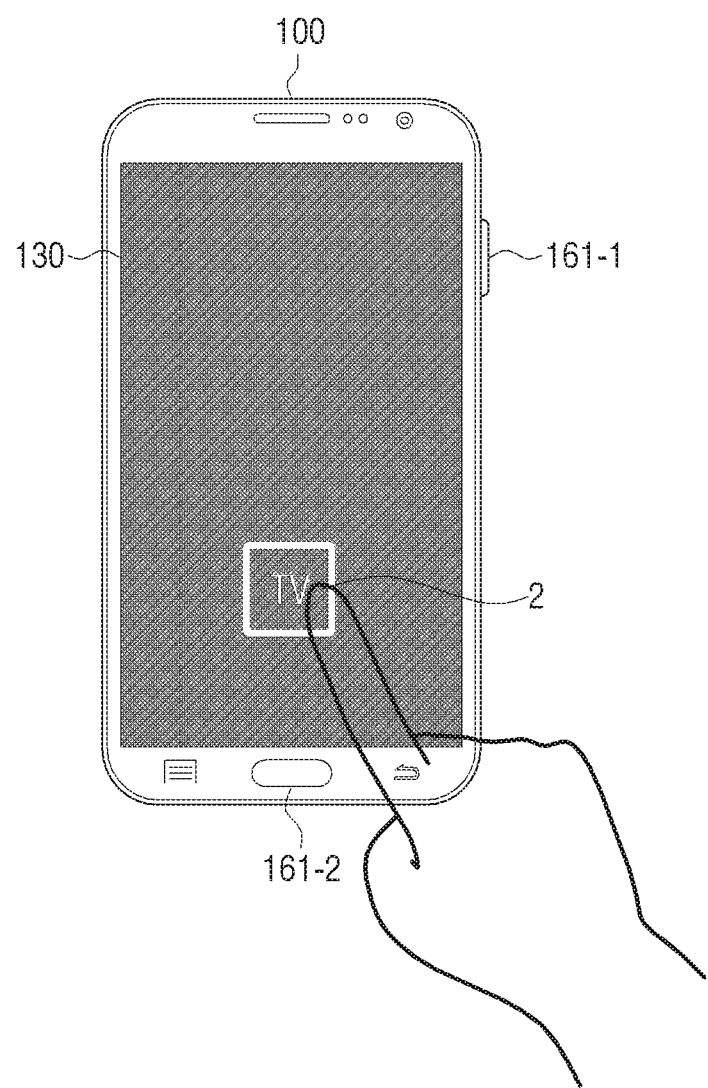
FIGS. 6A and 6B are various views to illustrate an operation of a display apparatus when an object displayed in the standby mode is selected according to an embodiment of the present disclosure.
Figure 6B:
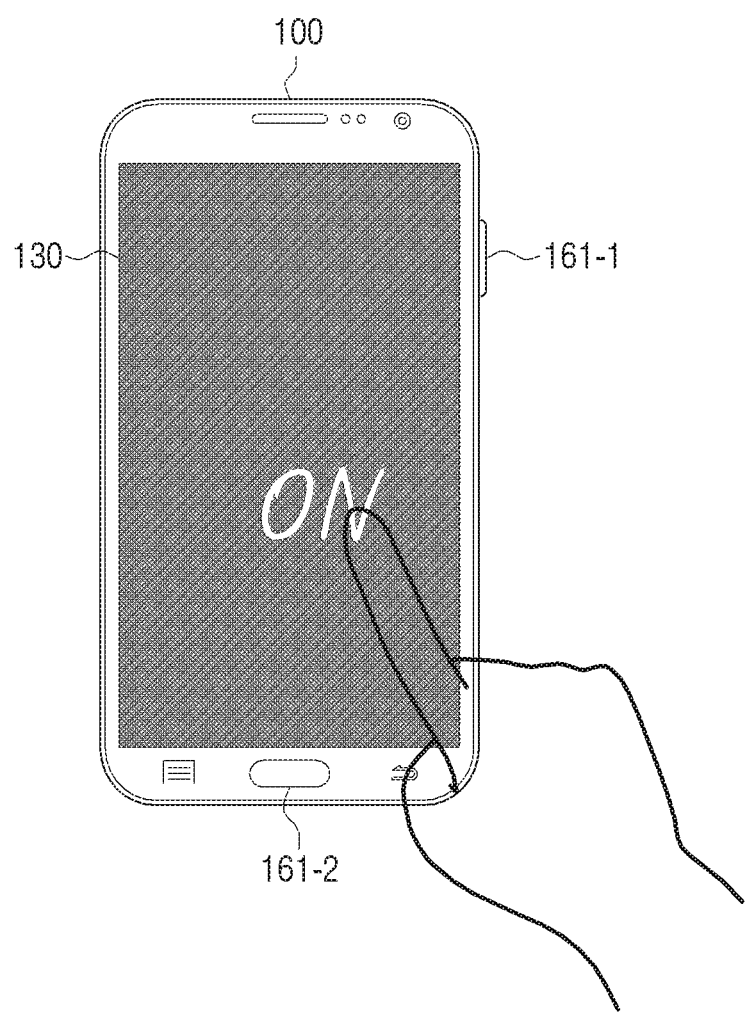

FIGS. 6A and 6B are various views which illustrate an operation of the display apparatus 100 when an object displayed in the standby mode is selected according to an embodiment of the present disclosure.

FIG. 6A shows a state in which the object 2 corresponding to the external device 200 is displayed in the second standby mode. At this time, if the user touches and selects the object 2, the display apparatus 100 can control the touch screen 130 to receive the handwriting input of the user. The selected object 2 may be deleted from the touch screen 130.

Accordingly, as illustrated in FIG. 6B, when the control command "ON" for turning on the power of the external device 200 on the touch screen 130 is handwritten, the display apparatus 100 may transmit a power on command to the TV 200.

Here, it can be seen that the handwriting input in FIG. 6B is different from the handwriting input in FIG. 5C. This is because, when the object is selected in the second standby mode and the control command is handwritten, the control target device to which the control command is to be transmitted can be specified according to the selection of the object. However, even when an object is selected in the second standby mode, the user can write on the touch screen 130 including the control target device as "TV ON" as shown in FIG. 5C. It is needless to say that the power-on command can be transmitted to the external device 200.

In contrast, when the touch screen 130 receives a user's handwriting input in response to a predetermined event occurring in the first standby mode, the user must input a character or the like including information on the control target device along with a control command as handwriting.

Figure 7A:
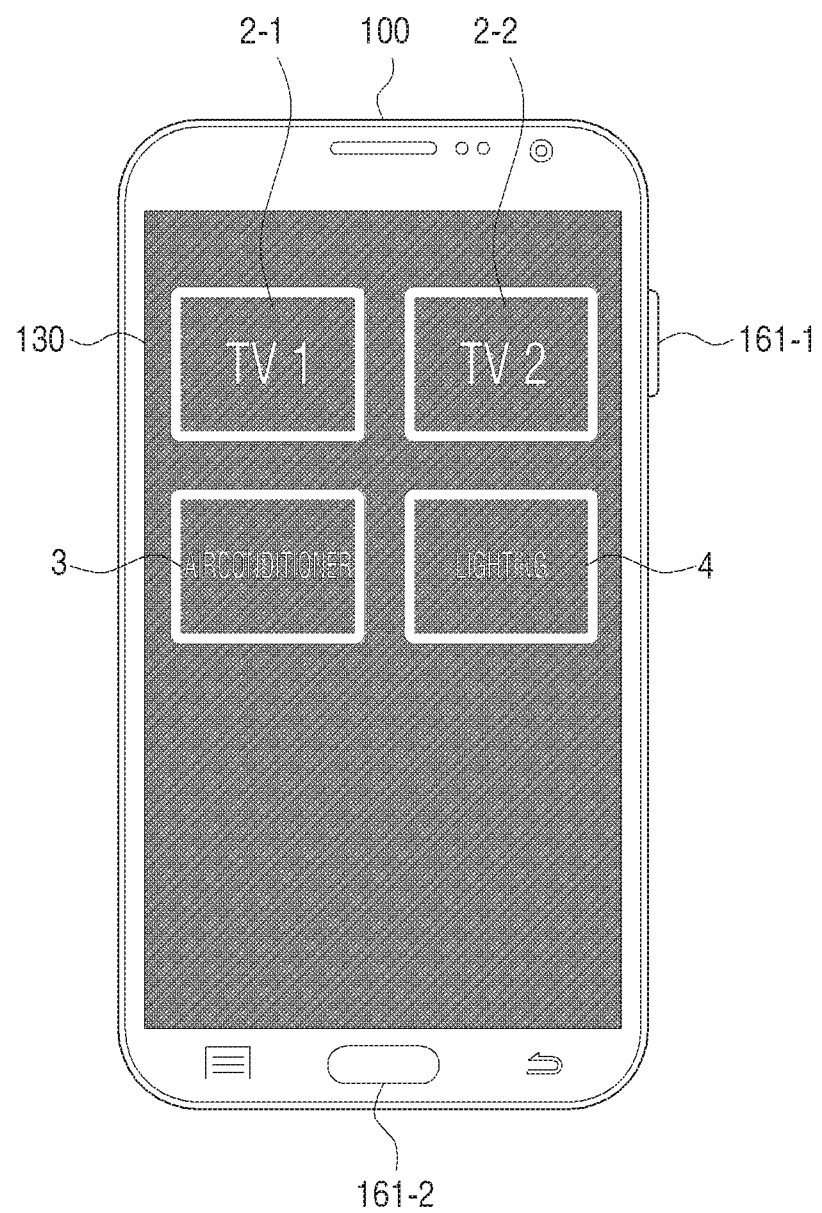
FIGS. 7A and 7B are various views to illustrate an object displayed in a standby mode state according to an embodiment of the present disclosure.
Figure 7B:
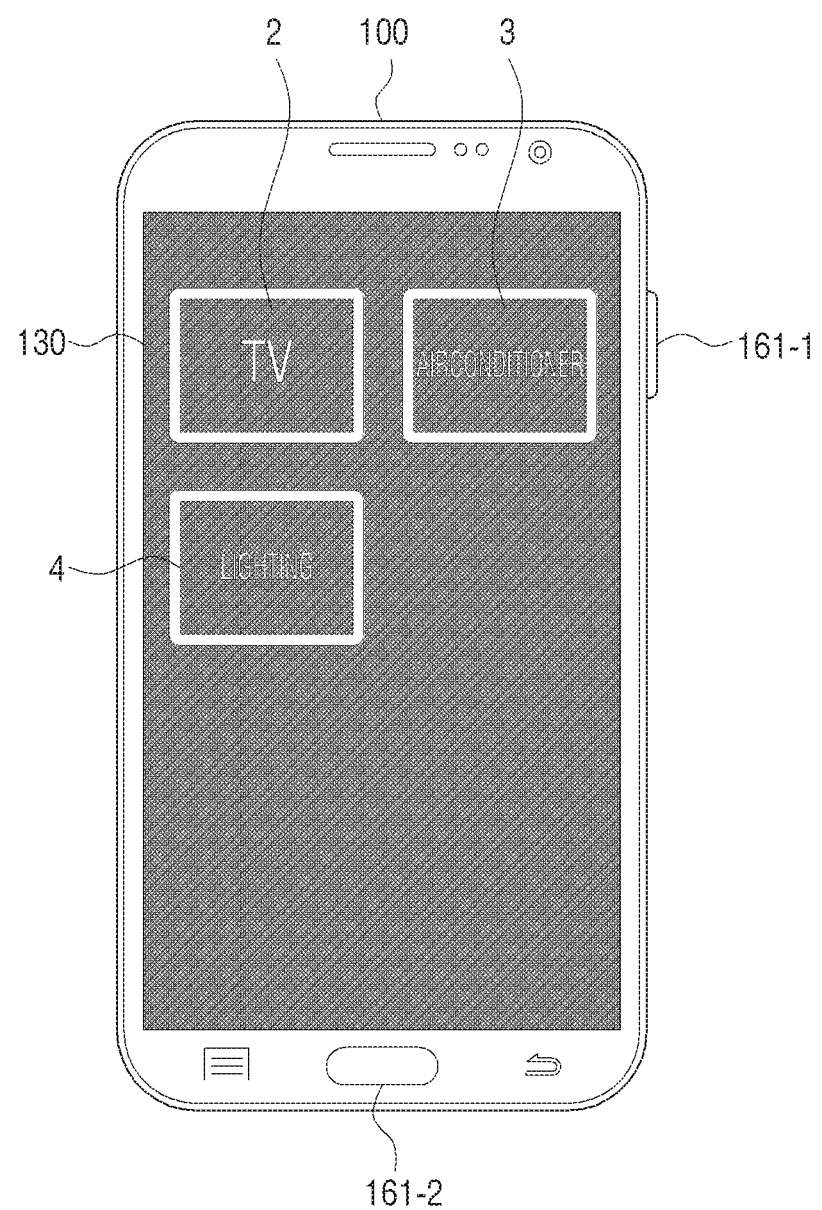

FIGS. 7A and 7B are various views illustrating a case of displaying a plurality of objects on the touch screen 130 by the display apparatus 100 in the second standby mode according to an embodiment of the present disclosure.

According to an embodiment, the display apparatus 100 may display objects by control target devices or types of control target devices in the second standby mode.

For example, if the display apparatus 100 stores control command information for TV1, TV2, air conditioner, and lighting, and objects of TV1, TV2, air conditioner, and lighting are set to a normal mode to be displayed in the second standby mode, the display apparatus 100 can display the objects 2-1, 2-2, 3 and 4 corresponding to the respective devices as shown in FIG. 7A.

These objects 2-1, 2-2, 3, and 4 displayed in the second standby mode can be selected by the user, and when one of them is selected by the user, the display apparatus 100 may control the touch screen 130 to receive the user's handwriting. For example, the user may select the object 2-2 to turn on the TV 2 and handwrite a control command such as "ON" to the touch screen 130.

FIG. 7B shows an example in which the display apparatus 100 displays objects according to the types of devices to be controlled. That is, as shown in FIG. 7B, the display apparatus 100 can display objects corresponding to TV1 and TV2, which are devices of the same type, as one object 2. In this case, in order to turn on the power of the TV 2, the user must select the object 2 and handwrite the name of the control target device and the control command together with the touch screen 130 such as "TV2 ON".

It is needless to say that the types of objects displayed in the second standby mode are not limited to those shown in FIGS. 7A and 7B. For example, the objects 2, 3 and 4 may be displayed in the form of thumbnails or icons representing TVs, air conditioners, lights, respectively.

Figure 8:
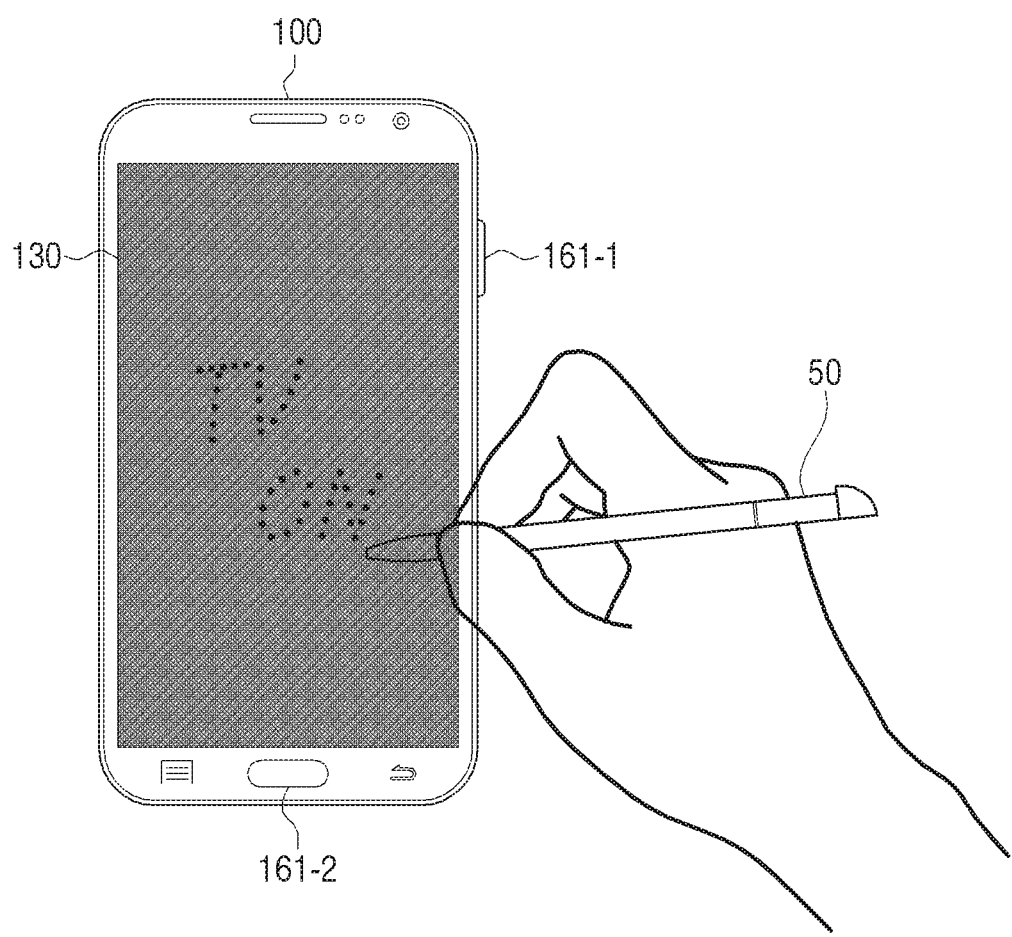
FIG. 8 is a view to illustrate an operation of a display apparatus for handwriting input according to an embodiment of the present disclosure.

FIG. 8 is a diagram illustrating an operation of a display apparatus during handwriting input according to an embodiment of the present disclosure. FIG. 8 shows a state in which the handwriting input of the user "TV ON" is received through the touch screen 130 but is not displayed.

That is, as illustrated in FIGS. 5C, 5D, and 6B, when the handwriting input of the user is received through the touch screen 130 due to a preset event occurring in the standby mode, the handwriting input of the user may be displayed on the touch screen 130 as shown in FIG. 8, but may not be displayed on the touch screen 130.

For example, the display apparatus 100 supplies power to the touch panel 131 of the touch screen configuration to receive a handwriting input from the user, and cut off the power supplied to the display 132 so that the handwriting input of a user is not displayed.

Figure 9A:
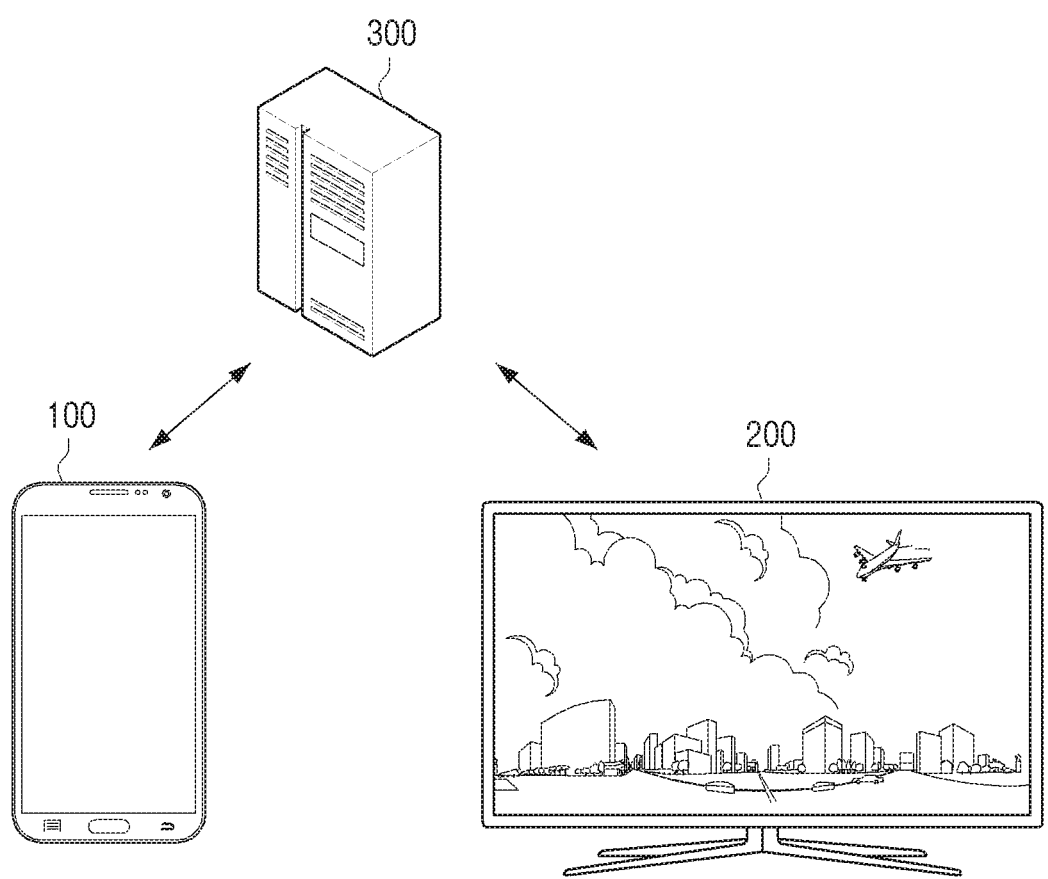
FIGS. 9A and 9B are various views to illustrate a communication method between a display apparatus and an external device according to an embodiment of the present disclosure.
Figure 9B:
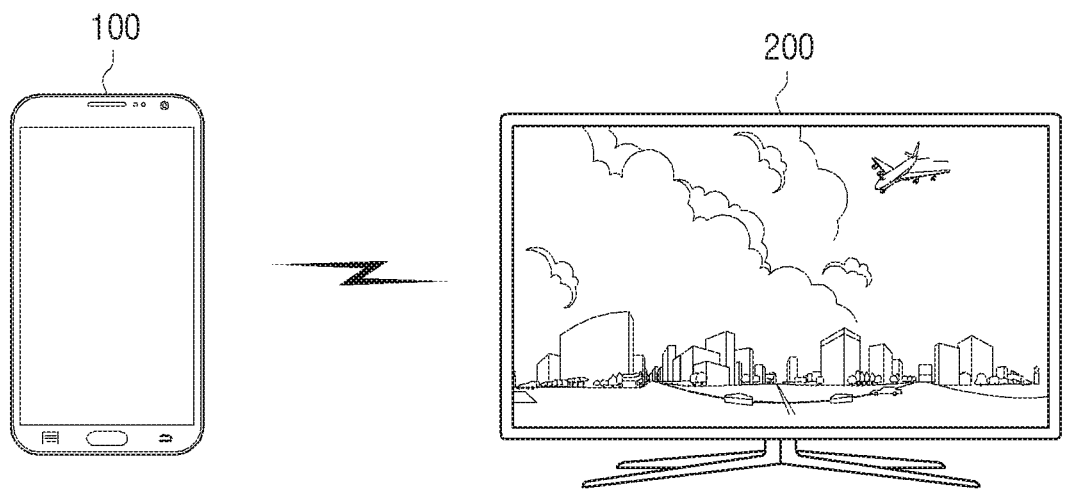

FIGS. 9A and 9B illustrate examples in which the display apparatus 100 and the external device 200 communicate with each other according to an embodiment of the present disclosure. To be specific, FIG. 9A illustrates a case where the display apparatus 100 and an external device, that is, the device 200 to be controlled, communicate with each other through the server 300.

The server 300 may store/update/manage control command information for each device and provide control command information for each device to the display apparatus 100. For example, the server 300 may receive the control command set of the external device 200 from the external device 200, and may store the control command set as the control command information of the external device 200 by matching with the external device 200. In this way, the server 300 can receive control command sets from various external devices, store them in matching with the respective devices, and manage the control command information for each device. Accordingly, the server 300 can provide control command information for each device to the display apparatus 100. At this time, the server 300 can provide only the control command information for each device registered through the account of the user to the display apparatus 100 registered through the account.

According to an embodiment, the server 300 may acquire control command information for various external devices from a separate server (not shown) that manages control command information for each device and provide the control command information to the display apparatus 100, and the display apparatus 100 may obtain control command information for each device directly from the separate server (not shown). On the other hand, as described above, the device-specific control command information may be a device-specific remote control application.

The server 300 can, if information on the control target device and control command information are received from the display apparatus 100, may transmit a control command to the external device 200 determined as the control target device. For example, when the identification information and the control command information of the control target device are received from the display apparatus 100 through an account, the server 300 can transmit the control command to the matching external device among the external devices registered in the account. Accordingly, the display apparatus 100 can acquire control command information for the external device 200 through the server 300, and can transmit the control command to the control target device connected to the server 300.

In this case, the user may first need to register the display apparatus 100 and the external device 200 in the server 300 through the account. Meanwhile, in the above embodiment, it is needless to say that a separate account management server (not shown) may be used for the account management of the user.

FIG. 9B shows an example in which the display apparatus 100 transmits a direct control command to an external device 200 according to an embodiment of the present disclosure. According to FIG. 9B, the display apparatus 100 can transmit a direct control command to the external device 200 determined as the control target device.

To be specific, the display apparatus 100 may communicate with the external device 200 using various near field communication methods such as Wi-Fi peer-to-peer (P2P), Bluetooth (BT), and near field communication (NFC) to transmit a control command to the external device 200.

For example, when the display apparatus 100 and the external device 200 communicates with each other via Wi-Fi P2P or BT methods, the display apparatus 100 may perform pairing between devices and transmit a control command to the external device 200.

If the display apparatus 100 and the external device 200 communicate with each other by the NFC method, when the display apparatus 100 and the external device 200 are brought into contact with each other or approach a predetermined distance or more, the display apparatus 100 may transmit a control command to the device 200. In this case, since the device to which the control command is to be transmitted is specified by the operation of tagging the display apparatus 100 to the external device 200 as the control target device, it is unnecessary to describe the information about the control target device in the handwriting input of the user.

Figure 10:
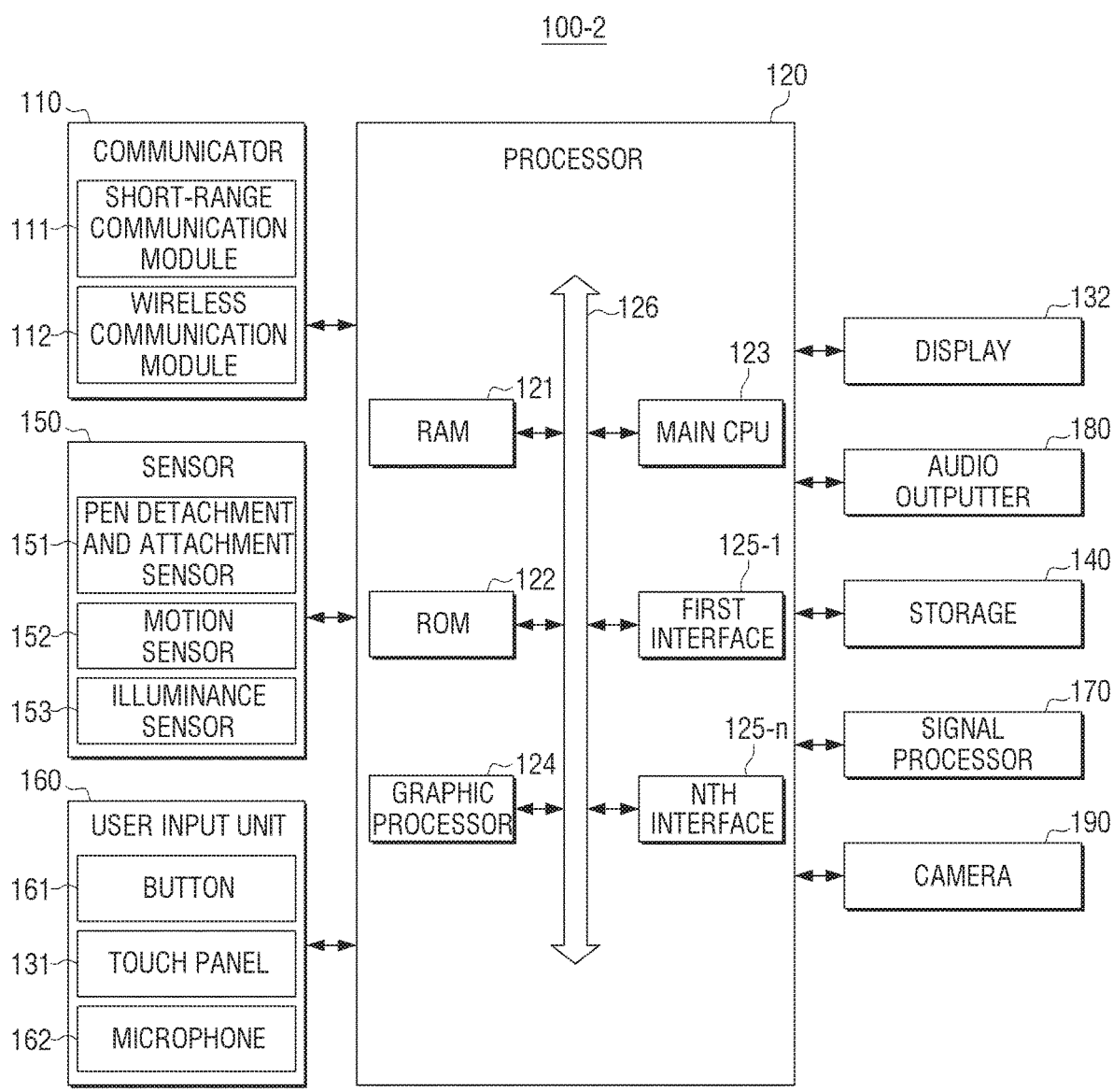
FIG. 10 is a detailed block diagram of a display apparatus according to an embodiment of the present disclosure.

FIG. 10 is a detailed block diagram of a display apparatus according to an embodiment of the present disclosure.

Referring to FIG. 10, the display apparatus 100-2 may include the communicator 110, the processor 120, the display 132, the storage 140, the sensing unit 150, the user input unit 160, an audio outputter 180, and a camera 190. In the description of FIG. 10, the duplicated description of the same components as those described above is omitted. The display apparatus 100-2 may be the display apparatus 100 or display apparatus 100-1.

FIG. 10 is a schematic view illustrating various components that may be included in the display apparatus 100-2. Therefore, according to the embodiment, some of the components shown in FIG. 10 may be omitted or changed, and other components may be further added. For example, the display 132 and the touch panel 131 of the user input unit 160 may have a mutual layer structure to form one touch screen 130, the combination of the components may be implemented as one chip or module, or each component may be divided into several components.

The communicator 110 communicates with the external device 200. In particular, the communicator 110 may communicate with the external device 200 through the external server 300 or may directly communicate with the external device 200.

To this end, the communicator 110 may include a short-range communication module 111 and a wireless communication module 112. The short-range communication module 111 is a configuration for performing short-range communication with the display apparatus 100-2 and at least one external device 200 located in close proximity to the wireless device. Specifically, the short-range communication module 111 includes at least one of a BT module, an infrared data association (IrDA) module, a NFC module, a Wi-Fi module, or a Zigbee module.

The wireless communication module 112 is a module that is connected to an external network according to a wireless communication protocol such as Wi-Fi, institute of electrical and electronics engineers (IEEE), and the like and communicates with the external server 300. In addition, the wireless communication module 112 may further include a mobile communication module for performing communication by accessing a mobile communication network according to various mobile communication standards such as 3rd Generation (3G), 3rd Generation Partnership Project (3GPP), and long term evolution (LTE).

The communicator 110 may further include a connector (not shown) which includes at least one of wired communication module (not shown) such as high-definition multimedia interface (HDMI), universal serial bus (USB), IEEE 1394 or the like.

The sensing unit 150 may sense attachment and detachment of the pen 50, the movement of the display apparatus 100-2, and the ambient brightness, and provide a sensing signal to the processor 120. The sensing unit 150 may include a pen attachment and detachment sensor 151, a motion sensor 152, and an illuminance sensor 153.

The pen attachment and detachment sensor 151 may detect detachment and attachment of the touch pen 50 from the display apparatus 100-2 and transmit the sensed signal to the processor 120.

The motion sensor 152 may detect a position or a movement of a display apparatus and provide the sensed movement signal to the processor 120.

To this end, the motion sensor 152 may include at least one of an acceleration sensor (not shown), a gyro sensor (not shown), or a geomagnetic sensor (not shown). The acceleration sensor (not shown) is a sensor that measures the spatial motion of the display apparatus 100-2. That is, the acceleration sensor (not shown) may sense at least one of a change in acceleration occurring when the user moves the display apparatus 100-2 or a change in acceleration. Here, the acceleration sensor (not shown) may be implemented as a three-axis acceleration sensor that measures the increase and decrease of the linear velocity with respect to three mutually orthogonal axes. The gyro sensor (not shown) is an inertial sensor that measures the rotational angular velocity of the display apparatus 100-2. That is, it means a sensor that can recognize the direction and speed of rotation by using the inertial force of a rotating object. The gyro sensor can be implemented as a three-axis angular velocity sensor measuring the increase and decrease of the rotation angle with respect to three mutually orthogonal axes. The geomagnetic sensor (not shown) is a sensor for measuring the azimuth. That is, a geomagnetic sensor (not shown) refers to a sensor that measures the azimuth angle by sensing a magnetic field formed in the north-south direction of the Earth. Here, the geomagnetic sensor (not shown) can be implemented as a three-axis geomagnetic sensor that measures magnetic intensity and direction with respect to three mutually orthogonal axes.

The illuminance sensor 153 may sense ambient brightness of the display apparatus 100-2 and provide the sensed signal to the processor 120.

The processor 120 may perform various operations according to various embodiments of the present disclosure using various signals detected by the sensing unit 150. That is, the processor 120 may control the touch panel 131 so that the display apparatus 100-2 enters the standby mode or receive the user's handwriting input in the standby mode, or use the control command as a trigger signal for transmitting the control command to the control target device.

The user input unit 160 is a user input interface to receive various manipulation commands of a user and transmit the commands to the processor 120. The user input unit 160 may include the button 161, the touch panel 131, and the microphone 162.

The button 161 may include a power button 161-1 to power on or power off the display apparatus 100-2, a home button 161-2 to return to the home screen, and a volume button (not shown) to control volume of various audio sounds such as call sound, bell sound, ringtone, music content and so on, which are reproduced through the audio outputter 180. According to an embodiment, the button 161 may be a button which constitutes a keypad including a number key and a character key. The button 161 includes a power button 161-1 for turning on/off the power of the display apparatus 100-2, a home button 161-2 for returning to the home screen, a ring tone, a ring tone, and a volume button (not shown) for controlling the volume of various audio reproduced through the audio outputter 180. In addition, according to the embodiment, the button 161 may be one button constituting a keypad having a numeric key, a character key, and the like.

Meanwhile, as described above, when another predefined operation other than the user operation for performing the above basic function allocated to the button 161 is input to the button 161 in the standby mode, the processor 120 may control the touch screen 130 to receive user handwriting input.

The touch panel 131 receives a user touch input. The touch panel 131, for example, may receive touch, gesture, proximity, or hovering input using a part of a user's body or the electronic pen 50.

More specifically, the touch panel 131 may include a plurality of patterned touch sensors (not shown). At this time, the touch sensor (not shown) may be implemented as an electrostatic type or a pressure sensitive type. The electrostatic touch sensor uses a dielectric coated on the surface of the display apparatus 100-2 so that when the user's body part or the touch pen 50 touches the surface of the display apparatus 100-2, and the touch coordinates are calculated by sensing the micro-electricity excited by the excitation light. The pressure sensitive type touch sensor includes two electrode plates built in the display apparatus 100-2. When the user touches the upper and lower plates of the touch point, the pressure sensitive type touch sensor senses that the current flows and the touch coordinates are calculated. In addition, the infrared sensing method, the surface ultrasonic wave conduction method, the integral tension measuring method, the piezo effect method, and the like can be used to detect the touch operation, and a detailed description thereof will be omitted.

The microphone 162 may receive various audio signals which are generated from an external sound source and convert the signals to electrical signals. In particular, the microphone 162 may receive a voice command of a user.

According to an embodiment, the user input unit 160 may further include a proximity sensor (not shown) and the touch panel 131 for receiving user handwriting input.

The display 132, for example, may display various contents (ex: text, image, video, icon, or symbol, etc.). The display 132 may constitute the touch screen 130 along with the touch panel 131.

The camera 190 can capture various images such as a still image and a moving image according to a user command. The camera 190 includes a lens and an image sensor, and may be disposed on the front or rear surface of the display apparatus 100-2. Meanwhile, according to an embodiment, the processor 120 can analyze the motion of the user or recognize the surrounding environment using the image input through the lens of the camera 190.

The signal processor 170 may process image data and audio data of various contents received from the outside through the communicator 110 or stored in the storage 140 under the control of the processor 120. Specifically, the signal processor 170 may perform various image processes such as decoding, scaling, noise filtering, frame rate conversion, and resolution conversion on the image data included in the content. The signal processor 170 performs various audio signal processing such as decoding, amplification, noise filtering, and the like on the audio data included in the content, and the processed audio data is output to an audio outputter (e.g., a speaker) 180 as audible sounds.

The storage 140 may store an operating system (O/S) to operate the display apparatus 100-2, various programs and data, and multimedia contents to perform operations of the display apparatus 100-2.

The processor 120 may include one or more of a central processing unit (CPU), a controller, an application processor (AP), a communication processor (CP), an ARM processor. The processor 120 may perform, for example, operations or data processing relating to the control and/or communication of at least one other component of the display apparatus 100-2.

For example, the processor 120 includes RAM 121, ROM 122, main CPU 123, a graphic processor 124, first to nth interface 125-1~125-n, and bus 126.

The RAM 121, ROM 122, the main CPU 123, the graphic processor 124, the first to nth interface 125-1~125-n can be interconnected through the bus 126.

The first to nth interface 125-1~125-n are connected with the aforementioned various components. One of the interfaces may be network interface connected to an external device through network.

The main CPU 123 accesses the storage 140 and performs booting using the O/S stored in the storage 140. Then, various operations are performed using various programs, contents, data stored in the storage 140.

The ROM 122 stores a command set for booting the system and the like. When the turn-on command is input and power is supplied, the main CPU 123 copies the O/S stored in the storage 140 to the RAM 121 according to the instruction stored in the ROM 122, executes O/S Boot system. When the booting is completed, the main CPU 123 can copy various programs stored in the storage 140 to the RAM 121, execute programs copied to the RAM 121, and perform various operations.

The graphic processor 124 generates a screen including various objects such as an icon, an image, and a text using an operation unit (not shown) and a rendering unit (not shown). An operation unit (not shown) calculates an attribute value such as a coordinate value, a shape, a size, and a color to be displayed by each object according to the layout of the screen based on the received control command. The rendering unit (not shown) generates screens of various layouts including the objects based on the attribute values calculated by the operation unit (not shown). For example, the graphic processor 124 may generate an object to be displayed on the touch screen 130 in a second standby mode.

Meanwhile, the operation of the processor 120 may be performed by a program stored in the storage 140. For example, according to another embodiment of the present disclosure, the processor 120 may execute the memo application stored in the storage 140 to control the touch screen 130 to receive user handwriting input. In addition, the processor 120 may execute a remote control application for the control target device determined through recognition of the handwriting input, and may transmit a control command for the control target device to the control target device.

Figure 11:
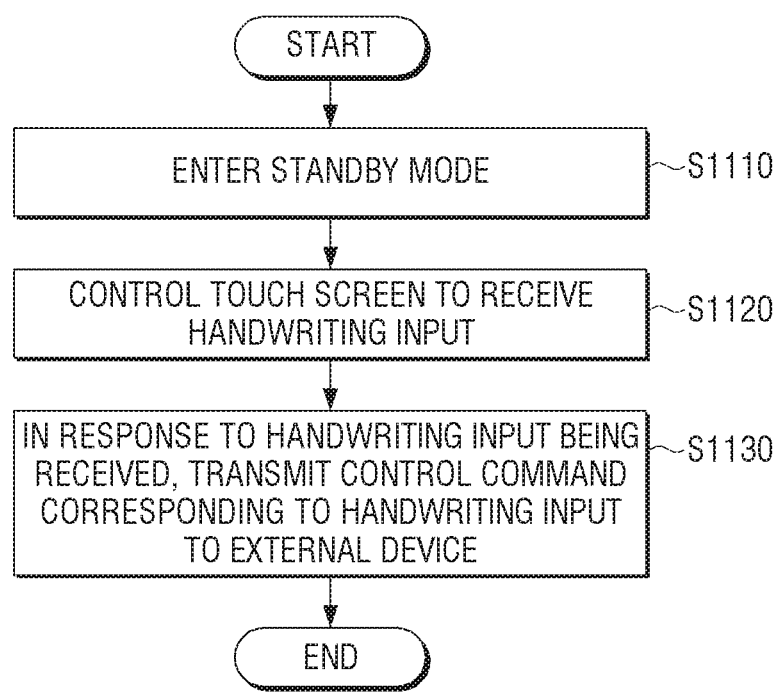
FIG. 11 is a flowchart illustrating a controlling method of an external device of a display apparatus according to an embodiment of the present disclosure.

FIG. 11 is a flowchart illustrating a method of controlling the display apparatus 100 according to an embodiment of the present disclosure.

Referring to FIG. 11, the display apparatus 100 may first enter the standby mode at operation S1110. In particular, the display apparatus 100 may include a touch screen 130 including a touch panel and a display for receiving touch inputs. Here, the standby mode may be a state in which at least some areas of the touch panel and the display are turned off when a user command for entering the standby mode is input or when no user command is input for a predetermined time. For example, the standby mode may be a first standby mode in which the power is turned off in both the touch panel and the display, a second standby mode in which the object is displayed by supplying low power.

When the preset event occurs in the standby mode, the display apparatus 100 may control the touch screen 130 to receive the user's handwriting input at operation S1120.

Specifically, the display apparatus 100 can control the touch screen 130 to receive the handwriting input of the user when the displayed object is selected in the second standby mode. In addition, the display apparatus 100 may control the touch screen 130 to receive a user's handwriting input if the pen's separation in the first standby mode is sensed or the user's default operation on the push-button is detected.

Accordingly, when the handwriting input of the user is received on the touch screen 130, the display apparatus 100 can transmit a control command corresponding to the handwriting input to the external device 200 at operation S1130. Accordingly, the external device 200 can perform the control operation according to the received control command.

Specifically, when the handwriting input of the user is received, the display apparatus 100 may determine the control target device and control command information matched with the handwriting input based on the control command information of each device stored in the display apparatus 100, and transmit the control command to the determined control target device.

Meanwhile, according to one embodiment of the present disclosure, the display apparatus 100 displays an object for each control target device in the second standby mode, and when one of the displayed objects is selected and a handwriting input of the user is received, the control command corresponding to the input may be transmitted to the control target device matched with the selected object.

In addition, according to another embodiment of the present disclosure, the display apparatus 100 detects the attachment of the pen 50 again after the handwriting input of the user is received according to the separation of the pen 50 in the first standby mode, and the control command may be transmitted to the external device.

In addition, the display apparatus 100 may display a handwriting input of a user received through the touch screen 130 on the touch screen 130, and may not display the input according to an embodiment.

According to various embodiments, a user may intuitively control an external device through a display apparatus. Accordingly, user convenience would be improved.

In the meantime, according to various embodiments, the operation of the processor 120 of the display apparatus 100 or a controlling method of the display apparatus 100 may be generated as software and provided on the display apparatus 100.

For example, when the display apparatus 100 including the touch screen 130 enters the standby mode, a non-transitory computer-readable medium can be installed on the display apparatus 100, the program performs a controlling method for an external device including the operations of, if the preset event occurs in the standby mode, controlling the touch screen to receive the handwriting input of the user and transmitting the control command corresponding to the handwriting input to the external device when the user's handwriting input for controlling the external device is received via the touch screen.

The non-transitory computer-recordable medium is not a medium configured to temporarily store data such as a register, a cache, or a memory but an apparatus-readable medium configured to semi-permanently store data. Specifically, the above-described various applications or programs may be stored in the non-transitory apparatus-readable medium such as a compact disc (CD), a digital versatile disc (DVD), a hard disc, a Blu-ray disc, a USB, a memory card, or a ROM, and provided therein.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A display apparatus comprising:
    a communicator configured to communicate with an external device;
    a sensor configured to sense detachment and attachment of a pen with the display apparatus;
    a touch screen; and
    a processor configured to:
        when the detachment of the pen is sensed through the sensor while in a standby mode in which the touch screen is blocked, control the touch screen to receive a handwriting input of a user,
        in automatic response to receiving the handwriting input of the user, control the touch screen to display the handwriting input of the user on the touch screen,
        when the handwriting input including a first word indicative of an external device and a second word indicative of a control command for controlling a function of the external device is received through the touch screen, determine the external device corresponding to the first word and the control command corresponding to the second word, and
        in automatic response to sensing the attachment of the pen through the sensor after receiving the handwriting input, control the communicator to transmit, to the external device, the control command for execution at the external device.

2. The display apparatus of claim 1, comprising:
    a push type button,
    wherein the processor is further configured to, in response to a predetermined operation regarding the push type button being input while in the standby mode, control the touch screen to receive the handwriting input of the user.

3. The display apparatus of claim 1,
    wherein the touch screen comprises a touch panel configured to receive a touch input and a display, and
    wherein the standby mode is a mode in which, in response to a user command to enter the standby mode being input or a user command not being input for a preset time, the display apparatus operates in a state of power of at least a part of the touch panel and the display being blocked.

4. The display apparatus of claim 1, wherein the display of the handwriting input of the user on the touch screen is configured to provide visual confirmation of the control command.

5. A controlling method of a display apparatus comprising a touch screen, the method comprising:
- entering a standby mode by the display apparatus;
- when detachment of a pen is sensed through a sensor while in a standby mode in which the touch screen is blocked, controlling the touch screen to receive a handwriting input of a user;
- in automatic response to receiving the handwriting input of the user, controlling the touch screen to display the handwriting input of the user on the touch screen;
- when the handwriting input including a first word indicative of an external device and a second word indicative of a control command for controlling a function of the external device is received through the touch screen, determining the external device corresponding to the first word and the control command corresponding to the second word; and
- in automatic response to sensing attachment of the pen through the sensor after receiving the handwriting input, transmitting to the external device the control command for execution at the external device.

6. The method of claim 5,
wherein the display apparatus further comprises a push type button, and
wherein the method further comprises, in response to a predetermined operation regarding the push type button being input while in the standby mode, controlling the touch screen to receive the handwriting input of the user.

7. The method of claim 5,
wherein the touch screen further comprises a touch panel configured to receive a touch input and a display, and
wherein the standby mode is a mode in which, in response to a user command to enter the standby mode being input or a user command not being input for a preset time, the display apparatus operates in a state of power of at least a part of the touch panel and the display being blocked.

8. The method of claim 5, wherein the displaying of the handwriting input of the user on the touch screen is configured to provide visual confirmation of the control command.

9. A non-transitory computer-readable recordable medium including a program to execute a controlling method of a display apparatus including a touch screen, wherein the method comprises:
- entering a standby mode by the display apparatus;
- when detachment of a pen is sensed through a sensor while in a standby mode in which the touch screen is blocked, controlling the touch screen to receive a handwriting input of a user;
- in automatic response to receiving the handwriting input of the user, controlling the touch screen to display the handwriting input of the user on the touch screen;
- when the handwriting input including a first word indicative of an external device and a second word indicative of a control command for controlling a function of the external device is received through the touch screen, determining the external device corresponding to the first word and the control command corresponding to the second word; and
- in automatic response to sensing attachment of the pen through the sensor after receiving the handwriting input, transmitting to the external device the control command for execution at the external device.

* * * * *